US009391898B2

(12) United States Patent
Pályi et al.

(10) Patent No.: US 9,391,898 B2
(45) Date of Patent: Jul. 12, 2016

(54) NON-CONGESTIVE LOSS IN HSPA CONGESTION CONTROL

(71) Applicant: TELEFONAKTIEBOLAGEL L M ERICSSON (PUBL), Stockholm (SE)

(72) Inventors: Pál Pályi, Budapest (HU); Szilveszter Nádas, Budapest (HU); Sándor Rácz, Cegléd (HU); Martin Skarve, Enebyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 99 days.

(21) Appl. No.: 14/244,238

(22) Filed: Apr. 3, 2014

(65) Prior Publication Data

US 2014/0301225 A1    Oct. 9, 2014

(30) Foreign Application Priority Data

Apr. 3, 2013  (EP) .................................... 13162136

(51) Int. Cl.
*H04L 1/00* (2006.01)
*H04L 12/801* (2013.01)
*H04L 12/825* (2013.01)

(52) U.S. Cl.
CPC .............. *H04L 47/11* (2013.01); *H04L 47/263* (2013.01)

(58) Field of Classification Search
CPC ......... H04L 47/10; H04L 47/11; H04L 47/12; H04L 47/13; H04L 2012/5631; H04L 2012/5632; H04L 2012/5633; H04L 2012/5634
USPC .................................. 370/229, 230, 465, 252
See application file for complete search history.

(56) References Cited

U.S. PATENT DOCUMENTS

| 8,908,524 B2 | 12/2014 | Rácz et al. |
| 9,112,797 B2 | 8/2015 | Ludwig et al. |
| 2007/0076598 A1* | 4/2007 | Atkinson ................ H04L 47/10 370/229 |

OTHER PUBLICATIONS

Biaz, S. et al. "Discriminating Congestion Losses from Wireless Losses using Inter-Arrival Times at the Receiver." 1999 IEEE Symposium on Application-Specific Systems and Software Engineering and Technology, Mar. 24-27, 1999, Los Alamitos, California, pp. 10-17.
Nádas et al., "HSPA Transport Network Layer Congestion Control." Chapter 9, HSDPA/HSUPA Handbook. pp. 297-330. Ed. Furht et al. 2011. Taylor and Francis Group, LLC, Abingdon, UK.

* cited by examiner

*Primary Examiner* — Dady Chery
(74) *Attorney, Agent, or Firm* — Coats & Bennett, P.L.L.C.

(57) ABSTRACT

A method and a network node for increased utilization of a transport network link over a transport network of a HSPA system. The method comprises detecting a data packet loss in receiving a data packet flow, and detecting data delay information of data packets as received. The method also comprises determining if the detected data packet loss comprise non-congestive data packet loss, based on the detected data packet loss and the detected data delay information. In addition, the method comprises, when the detected data packet loss comprises non-congestive data packet loss, for a predetermined time period, omitting to perform a congestion action affecting the data packet flow. By determining whether a data packet loss is non-congestive or not, an unnecessary reduction of the bitrate over the transport network can be omitted.

20 Claims, 4 Drawing Sheets

NON-CONGESTIVE LOSS IN HSPA CONGESTION CONTROL

This application claims priority under 35 U.S.C. §119(a) to European Patent No. EP13162136.9, which was filed Apr. 3, 2013 and is incorporated herein by reference in its entirety.

TECHNICAL FIELD

This disclosure relates to a methods and nodes for increased utilization of a transport network link of a high-speed packet access (HSPA) system.

BACKGROUND

In the universal mobile telecommunications system terrestrial radio access network, two potential bottlenecks in the data communication are the air interface and the transport link of the transport network. The transport link connects a radio network controller (RNC) and a Node B.

FIG. 1 schematically presents a RNC 102 connected to Node B 104 over the Iub interface. The interface between the Node B 104 and a user equipment is the Uu air interface.

The transport link between the RNC 102 and Node B 104 can be a bottleneck when its capacity is smaller than the available maximal capacity over the air interface Uu. For example, a typical scenario is when the Node B 104 is connected to the RNC 102 through an E1 link having a capacity about 2 Mbps, and the available air interface Uu capacity for HSPA is significantly larger that this 2 Mbps. This means that a single radio communication device, such as user equipment, can overload the transport network (TN) at certain radio conditions.

Consequently, in the TN, packet loss may occur due to congestion or due to other reasons, i.e. data corruption.

In the Uu interface fair sharing of resources may be performed by the Uu scheduler. However, the Uu scheduler cannot handle a potential transport link bottleneck.

Hence, since the radio access network TN may be a potential bottleneck, congestion control is needed on the transport network.

There are techniques to handle TN level congestion situations, which techniques are widely deployed in running HSPA network of today.

The per-flow HSPA transport network congestion control and the active queue management (AQM) based congestion control (ABCC), are examples of congestion control techniques.

A gap in the sequence of data packets of the data packet indicates a data packet loss. This data packet loss is interpreted as congestion in the per-flow HSPA transport network congestion technique. This interpreted congestion causes a congestion action to be performed in the form of a reduction of the maximum allowed bitrate of the data packet flow. The maximum of the allowed bitrate may be reduced by as much as 50%.

In the ABCC, upon an interpreted congestion, the TCP layer is informed of TN congestion by dropping an application level IP packet.

Irrespective of the reason for the packet loss, a gap in the sequence is interpreted as congestion.

SUMMARY

It is an object of example embodiments of the invention to determine whether non-congestive packet loss occurs and a congestion action can be omitted.

This object and others are achieved by the method and the device according to the appended independent claims, and by the embodiments according to the dependent claims.

A first example embodiment provides a method for increased utilization of a transport network link in receiving a data packet flow from a first network node over the transport network of a HSPA system. The method that is performed in a second network node, comprises detecting a data packet loss in receiving a data packet flow, and detecting data delay information of data packets of the data packet flow as received from the first network node. The method also comprises determining if the detected data packet loss comprise non-congestive data packet loss, based on the detected data packet loss and the detected data delay information. In addition, the method comprises, when the detected data packet loss comprises non-congestive data packet loss, for a pre-determined time period omitting to perform a congestion action towards the first network node affecting the data packet flow.

Determining may comprise determining if the data delay of received data packets is within a pre-defined delay threshold or if a time dependence of the data delay of data packets being received is decreasing with time.

The method may further comprise determining the number of data packet loss events, during a pre-determined first time period or per a pre-determined first number of data packets sent from the first network node, based on the detected data packet loss.

When the determined number of data packet loss events comprises a number of data packet loss events during a second pre-determined time period, said number of data packet loss events during the second pre-determined time period may be considered as a single data packet loss event.

When the determined number of data packet loss events comprises less than a pre-determined second number of consecutive data packet loss events, said consecutive data packet loss events may be considered as a single data packet loss event.

When the determined number of data packet loss events comprises more than a pre-determined third number of data packet loss events, it can be determined that the detected data packet loss comprises congestive data packet loss.

Omitting to perform a congestion action, may comprise omitting to reduce the maximum allowed bitrate for the data packet flow, or to inform the transport layer related to the first and second network nodes, about transport network congestion with a dropped application level Internet protocol data packet.

Detecting a packet loss may comprise detecting a gap in a sequence of data packets of the data packet flow, a corrupt data packet among the data packets of the data packet flow, or an explicit congestion notification mark of a data packet of the data packet flow.

Detecting data delay information may comprise detecting a delay of a data packet of the data packet flow received by the second network node, based on a reference time filled in a time field of the data packet.

Receiving the data packet flow may comprise receiving a high-speed uplink packet access data packet flow, or a high-speed downlink packet access data packet flow.

A second example embodiment provides a network node configured for increased utilization of a transport network link in receiving a data packet flow from another network node over the transport network of a HSPA system. The network node comprises a receiver that is configured to receive the data packet flow, and a detector that is configured to detect a data packet loss in the received data packet flow, and to detect data delay information of data packets of the data packet flow. The network node also comprises a controller that is configured to determine if the detected data packet loss comprise non-congestive data packet loss, based on the detected data packet loss and the detected data delay information. The controller is further configured to, for a pre-determined time period, omit to perform a congestion action towards the first network node affecting the data packet flow, when the detected data packet loss comprises non-congestive data packet loss.

The detector may be configured to detect a gap in a sequence of data packets of the data packet flow.

The detector may be configured to detect a delay of a data packet of the data packet flow based on a reference time filled in a time field of the data packet.

The detector and the controller may be implemented as a congestion detector of the network node.

The flow of data packets may comprise a flow of data frames.

The network node may comprise a Node B or a radio network controller, RNC.

It is advantageous with example embodiments that the end user throughput and the utilization of low quality TN links is increased by omitting to perform unnecessary congestion actions in the case of non-congestive packet loss events.

BRIEF DESCRIPTION OF THE DRAWINGS

Example embodiments will now be described in more detail, and with reference to the accompanying drawings, in which:

FIGS. 2, 3, 4A and 4B are flowcharts illustrating embodiments of the invention;

DETAILED DESCRIPTION

In the following description, different example embodiments of the invention will be described in more detail, with reference to accompanying drawings. For the purpose of explanation and not limitation, specific details are set forth, such as particular scenarios and techniques in order to provide a thorough understanding.

As was described above a gap in the sequence of data packet flow indicates a data packet loss, and this data packet loss is interpreted as congestion in the per-flow HSPA transport network congestion control.

The HSPA transport network congestion control does not distinguish between congestive and non-congestive packet loss. Packet loss is therefore always considered to be due to congestion. In the case of a detected packet loss, congestion action will be performed irrespective of the reason of the packet loss.

A data packet loss does not need to be caused by congestion. The packet loss may instead be a non-congestive packet loss, i.e. a packet loss that is not caused by congestion.

A non-congestive loss may thus be mistaken as a congestive packet loss. Since a congestive packet loss causes a congestion action to be performed, a non-congestive loss mistaken as a congestive loss would also cause a congestion action. When applying the per-flow HSPA transport network congestion control, the congestion action would be executed as an unnecessary reduction of the maximum bitrate over the TN. Hence, if non-congestive packet loss occurs frequently, which may happen in the case of a low quality TN, the HSPA transport network congestion control would result in an unnecessarily low end-user throughput and low utilization of the bandwidth of the TN.

Figure 1:
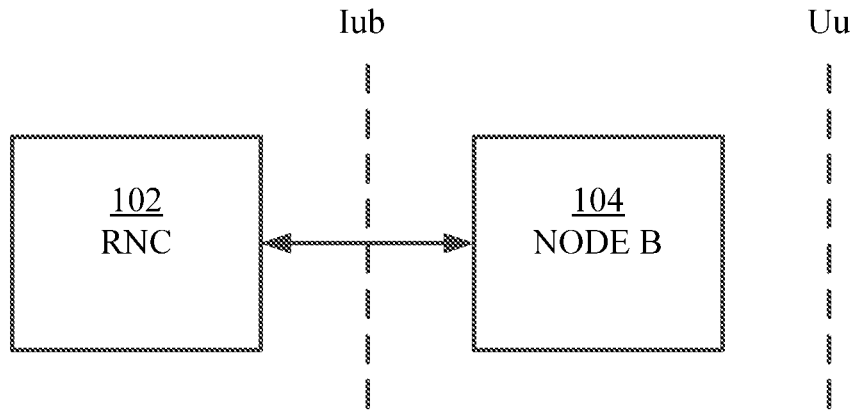
FIG. 1 schematically presents a part of a transport network.
Figure 2:
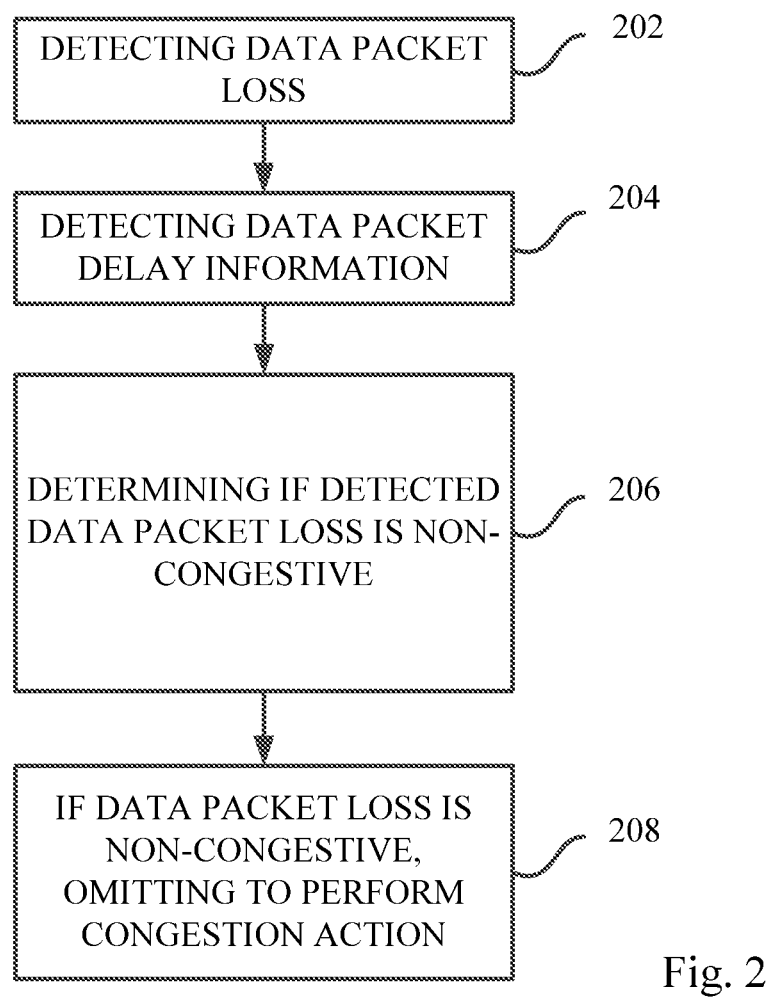

FIG. 2 presents a flowchart according to some embodiments of the present invention. The flowchart illustrates a general method for increased utilization of a transport network link in receiving a data packet flow from a first network node over the transport network of a HSPA system. The method is performed in a second network node of the HSPA system.

In 202 a data packet loss in receiving a data packet flow, is detected. In 204 it is detected data delay information of data packets of the data packet flow as received from the first network node.

In 206 it is determined if the detected data packet loss comprises non-congestive data packet loss, based on the detected data packet loss and the detected data delay information. When the detected data packet loss comprises non-congestive data packet loss, for a pre-determined time period it is omitted 208 to perform congestion action towards the first network node affecting the data packet flow.

Determining may comprise determining if the data delay of received data packets is within a pre-defined delay threshold or if a time dependence of the data delay of data packets being received is decreasing with time.

The method may further comprise determining the number of data packet loss events, during a pre-determined first time period or per a pre-determined first number of data packets sent from the first network node, based on the detected data packet loss.

When the determined number of data packet loss events comprises a number of data packet loss events during a pre-determined second time period, said number of data packet loss events during a pre-determined second time period may be considered as a single data packet loss event.

When the determined number of data packet loss events comprises less than a pre-determined second number of consecutive data packet loss events, said number of consecutive data packet loss events may be considered as a single data packet loss event.

When the determined number of data packet loss events comprises more than a pre-determined third number of data packet loss events, it can be determined that the detected data packet loss comprises congestive data packet loss.

Omitting to perform a congestion action, may comprise omitting to reduce the maximum allowed bitrate for the data packet flow, or to inform the transport layer related to the first and second network nodes about transport network congestion with a dropped application level Internet protocol data packet.

Detecting a packet loss may comprise detecting a gap in a sequence of data packets of the data packet flow, a corrupt data packet among the data packets of the data packet flow, or an explicit congestion notification mark of a data packet of the data packet flow.

Detecting data delay information may comprise detecting a delay of a data packet of the data packet flow received by the second network node, based on a reference time filled in a time field of the data packet.

It is noted congestion control can be applied in both the uplink and downlink, i.e. high-speed uplink data packet access and high-speed downlink data packet access, respectively.

It is emphasized that no congestion action is to be performed on the occurrence of non-congestion packet loss.

Furthermore, it is proposed that the method as presented in FIG. 2 is configurable and can be switched on in the case of a low quality TN, where non-congestive packet loss occurs frequently.

Non-congestive packet loss detection may be performed by using frame loss detection and dynamic delay detection.

Embodiments of the invention are applicable to rate-based, window-based and active queue management based congestion control techniques. In the case of HSPA transport network congestion control, no bitrate reduction is performed upon detection of non-congestive loss events. In the case of ABCC, the lost packets are retransmitted by the radio link control protocol acknowledged mode mechanism, and the transmission control protocol is not informed about congestion.

In case the transport network links are of high quality, the method for increased utilization of a transport network link in receiving a data packet flow from a first network node over the transport network of a HSPA system, is switched off. Having the method switched on would cause an increased reaction time on congestion unnecessarily.

Figure 3:
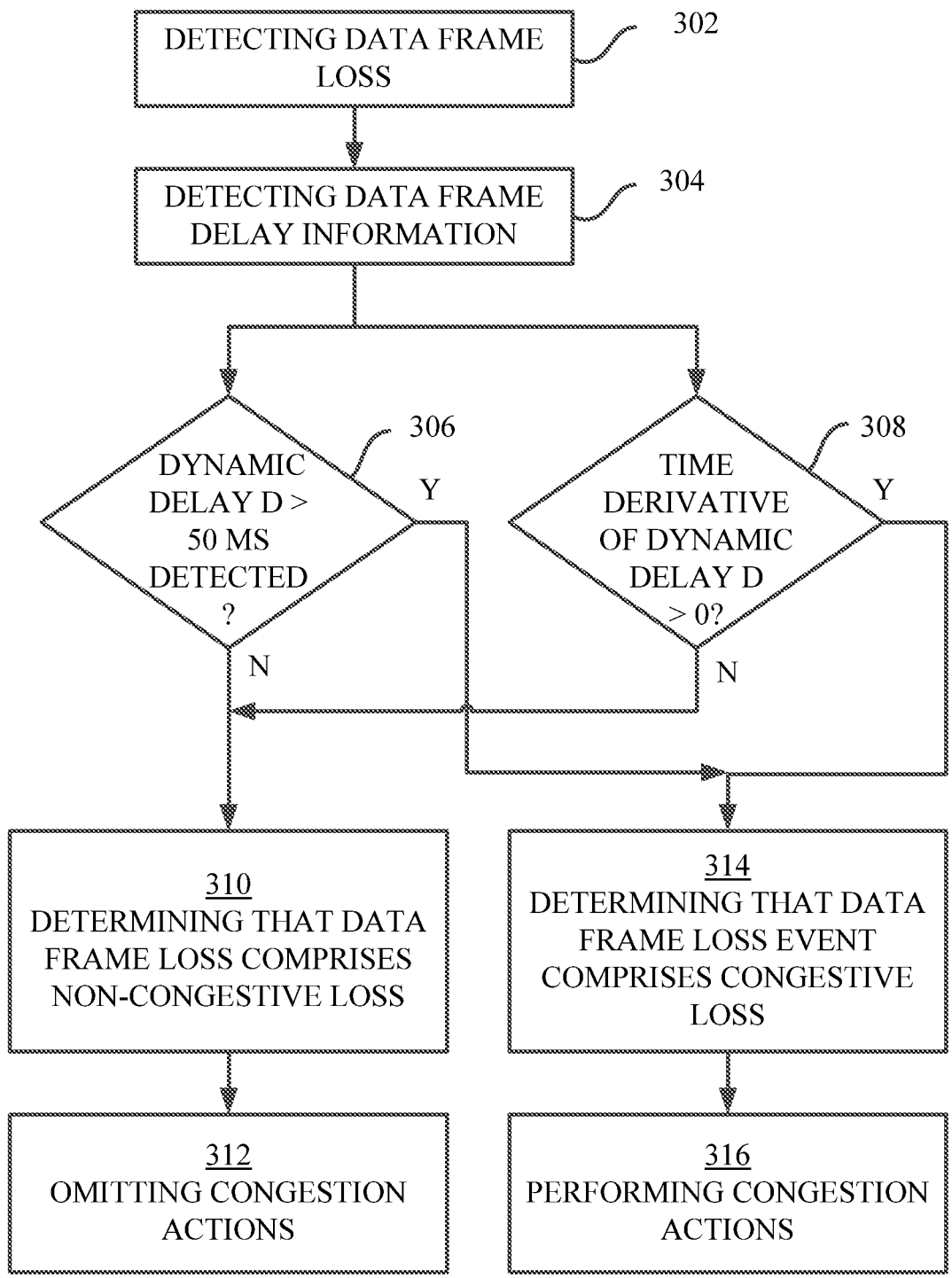

FIG. 3 presents a flowchart of a method according to some embodiments of the invention. This flowchart illustrates a method for increased utilization of a transport network link in receiving a data packet flow from a first network node over the transport network of a HSPA system. The method is again performed in a second network node of the HSPA system.

In 302 data frame loss is detected. The Iub framing protocol may here be used to detect data frame loss. In 304 data frame delay information is detected. In order to detect a data frame delay, the so-called delay reference time field of data frames may be used. The delay reference time may be regarded as a timestamp of the data packet when located at or passing a first network node. At the time the data packet is located at or passing a second network node, an amount of time has passed. This amount of time is checked and handled according to the presented method.

In 306 it is determined whether a dynamic delay D of a data packet of the data packet flow is larger than 50 milliseconds (ms) is detected, or not. If the dynamic delay D larger than 50 ms is not detected 306(N), it is determined that data frame loss comprises non-congestive loss event in 310. Based on large amounts of experience it has been concluded that a dynamic delay >ca 40-50 ms dynamic delay reflects a congestive loss.

Within some embodiments, a 50-ms threshold for the data delay may be used. In other embodiments of the invention, other thresholds, for instance 40 ms and 100 ms, for the data delay may be used. In 312 congestion actions are omitted.

If a dynamic delay D larger than 50 ms is in fact detected 306(Y), it is determined 314 that data frame loss comprises congestive loss. Similar to 310 above, 314 is determined based on large amounts of experience. In 316 congestion actions may then be performed.

It is noted that 316 performing congestion actions does not fall within the present invention. Herein, it is merely included as a contrast to omitting congestion actions in 312, in the case the data frame loss comprises non-congestive loss.

In parallel with 306 determining whether a dynamic delay D of a data packet of the data packet flow is larger than 50 milliseconds (ms) is detected, or not, it is determined 308 whether the time derivative of the dynamic delay D is positive, or not. It is thus determined the time dependence of the delay of data packets of the data packet flow.

On the one hand, if the time derivative of the dynamic delay D is not positive 308(N), it is again determined 310 that data frame loss comprises non-congestive loss event.

On the other hand, if it is determined in 308(Y) that the time derivative of the dynamic delay D is positive, it is again determined 314 that data frame loss comprises congestive loss. Therefore, congestion actions are performed 316.

Figure 4A:
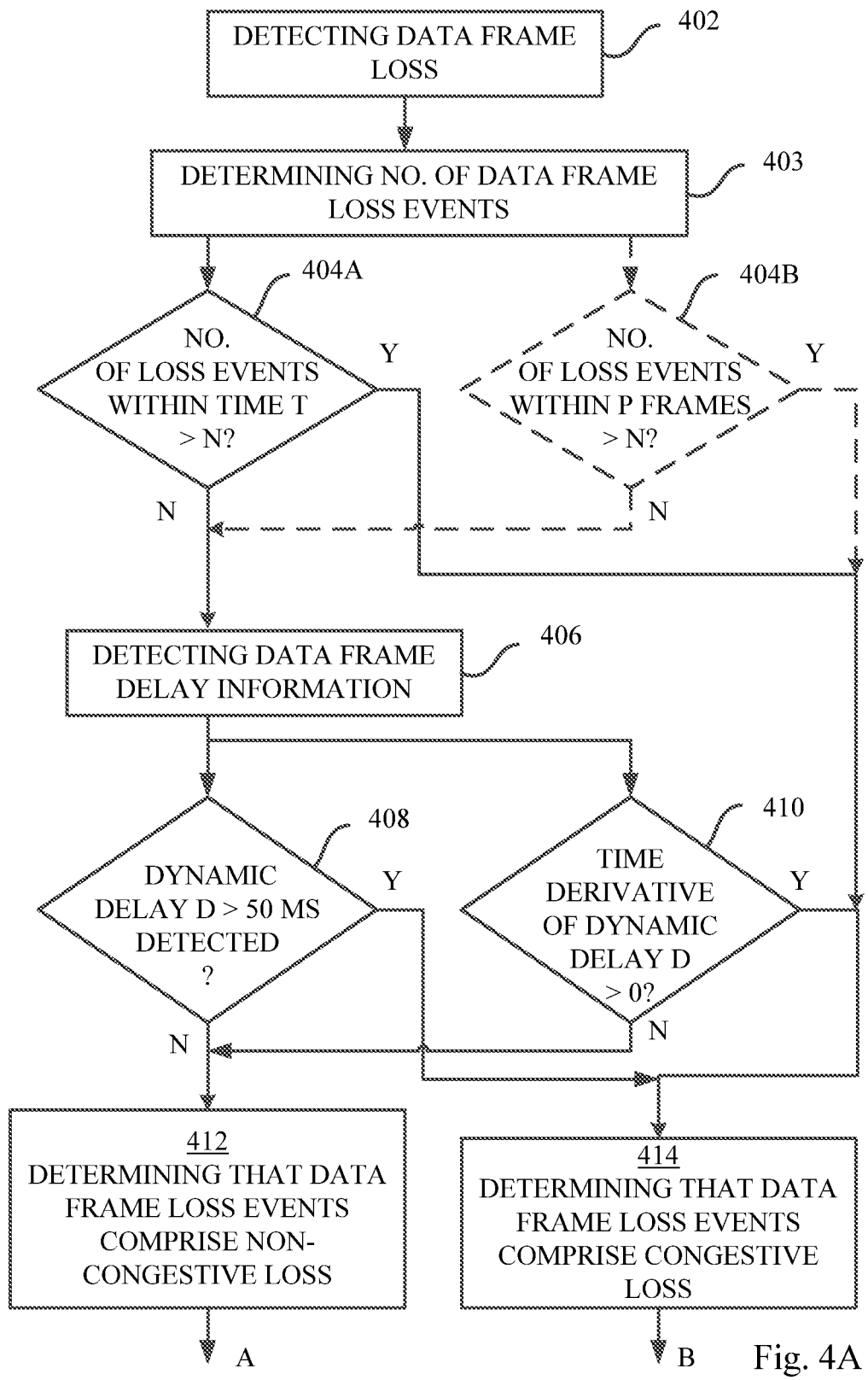

Similar to flowcharts presented in FIGS. 2 and 3, FIGS. 4A and 4B present a method for increased utilization of a transport network link in receiving a data packet flow from a first network node over the transport network of a HSPA system. The flowchart of FIGS. 4A and 4B present a method according to some other embodiments of the invention. The method as performed in FIGS. 4A and 4B is performed in a second network node of the HSPA system.

In 402 data frame loss is detected. This frame loss may be detected by the Iub framing protocol. In 403 the number of data frame loss events of the data frame loss is determined. As will be described down below, it is often important to consider the circumstances at which packet loss events occur in determining whether a plurality of data packet loss events. Multiple data packet loss events may be considered as a single data packet loss event or not.

Figure 5:
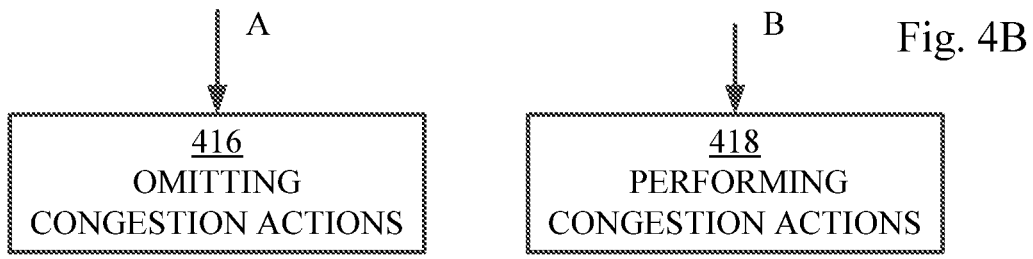
FIGS. 5 and 6, schematically indicate principles related to the number of data packet loss events, according to some embodiments of the invention.
Figure 5:
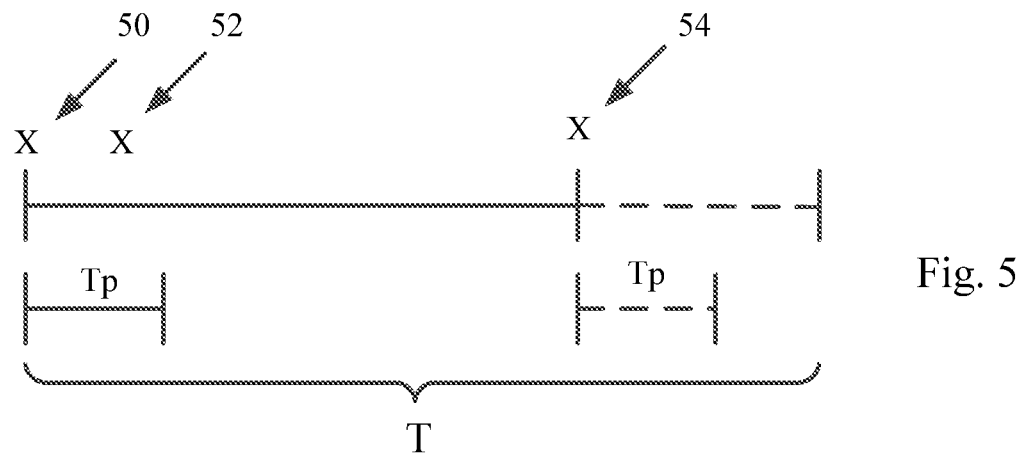
Figure 6:
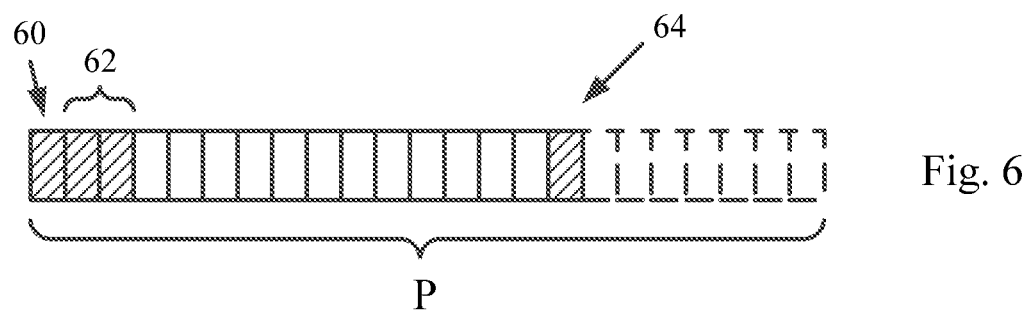

Within 403 in the flowchart in FIG. 4A, two examples of how the number of data packet loss events can be determined will now be presented with reference to FIGS. 5 and 6.

FIG. 5 schematically illustrates a time line along which data frame loss events can be detected. An "X" is a marker of a detected data frame loss event along the time line. At the time a first data frame loss events occurs, an "X" 50 is marked along the time line and a timer T is started. If a second data frame loss event "X" 52 is detected within a time Tp from the detection of the first data frame loss event, the first 50 and second 52 data frame loss events are considered a single data frame loss event. The timer T and Tp can be set to 200 ms and 10 ms, respectively, although other values may be used. Timer T is typically significantly larger than timer Tp.

For instance, if data frame loss event 52 is detected at a time that is sufficiently short from the detection of the detection of the first data frame loss event 50, i.e. within time Tp, both these data frame loss events are considered to be one single data frame loss event. Based on experience of data frame loss event analyses, it has been found reliable to treat data frame loss events occurred during a short time duration as one single data frame loss event, in a method for increased utilization of a transport network link in receiving a data packet flow from a first network node over the transport network of a HSPA system.

When the data frame loss event "X" 54 is detected, it is again determined whether any further data frame loss events are detected within a time Tp from the time at which data frame loss event "X" 54 was detected. The occurrence of "X" 54 increments the number of detected data frame loss events.

In 404A it is determined whether the number of data frame loss events is increased beyond a number N within a time period T, or not. In the case it is determined that the number of data frame loss events is not increased beyond N within time T, 404(N), data frame delay information is detected 406.

In the case it is determined that the number of data frame loss events is increased beyond N within time T, 404(Y), it is determined 414 that data frame loss event comprises congestive loss.

For instance, if the number of data frame loss events during time T is increased beyond N after the occurrence of "X" 54, it is concluded that data frame loss event comprises congestive loss.

The time T is one example of the pre-determined first time period. The time Tp is one example of the pre-determined second time period.

It is noted that 404A and 404B illustrate two alternative embodiments of the present invention. It is thus not the intention to determine both 404A and 404B in the same flowchart. For this reason 404B is illustrated with dotted lines. In one flow, either 404A or 404B is thus being executed.

FIG. 6 illustrates another way to interpret the number of detected data frame loss events, which way is similar but different from the way as illustrated in FIG. 5. FIG. 6 schematically presents a number of consecutive frames in a data frame flow. A shaded data frame indicates that a data frame loss event has occurred during this data frame. The data frame loss event may comprise that the data frame is corrupt or that it comprises a gap in the sequence of data frames.

If a data frame loss event 60 is detected, it is determined whether there are consecutive data frame loss events directly following the detected data frames loss event 60. In FIG. 6, it is illustrated two consecutive data frame loss events 62 directly following the data frame loss event 60. In this case, these consecutive data frame loss events, i.e. data frame loss events 60 and 62, all correspond to a single data frame loss event, provided that they occur within a P number of packets.

It has been found useful to be able to group consecutive data frame loss events as a single data frame loss event for a subsequent determination of whether a number of data frame loss events detected has increased beyond a number N within a number of data frames P directed to the network node.

If a data frame loss event 64 is detected within P data frames, the number of detected data frame loss events is incremented. If the incremented number of data frame loss events within P data frames thereby increases beyond the number N, it is determined that the frame loss events comprise congestive loss.

In 404B it is thus determined whether the number of data frame loss events within the number of P data frames, is larger than N, or not. If the number of data frame loss events occurred is not larger than N 404B(N), it is determined data frame delay information is detected in 406. In the case, the number of data frame loss events occurred is larger than N, 404B(Y), it is concluded that the frame loss events comprise congestive loss.

As described above, the data frame delay information may be determined by using the so-called delay reference time field of data frames. The delay reference time may be regarded as a timestamp of a data packet when located at or passing a first network node. At the time the data packet is located at or passing a second network node, an amount of time has passed. This amount of time is checked and handled according to the presented method.

Having detected data frame delay information in 406, it is now determined 408 whether said information in the form of the dynamic delay D is larger than a set time, for instance 50 ms, or not. In parallel it is also determined 410 whether the time derivative of the delay information in the form of the dynamic delay D is positive, or not.

The dynamic delay may be measured by detecting the time elapsed since a time counter was started. One way to determine the delay is to initiate a time counter in the network node from which the data flow is received, and to detect the time elapsed when it is received. Since the data frames arrive in a flow of data frames, the dynamic data delay may be the detected delay for each one of the data frame arrived in a sequence of data frames.

The time derivative of the dynamic delay D reflects the time dependence of the dynamic delay. If the time derivative is positive, the dynamic delay D increases with increasing time, and if the time derivative is negative, the dynamic delay D decreases with increasing time.

As illustrated in the flowchart of FIG. 4A, it is determined 412 that the data frame loss comprises non-congestive loss, when the dynamic delay D>50 ms has not been detected 408(N) or/and that the time derivative of the dynamic delay D is not positive 410(N). Also, it is determined that the data frame loss comprises congestive loss, when a dynamic delay >50 ms has been detected 408(Y) or/and that the time derivative of the dynamic delay D is positive 410(Y).

At the points where the flowchart ends in FIG. 4A, i.e. at points A and B, new points begin in a flowchart of FIG. 4B.

After it is determined that the data frame loss comprises non-congestive loss in 412 of FIG. 4A, congestion actions are omitted, according to 416 of FIG. 4B. Similarly, after it is determined that the data frame loss comprises congestive loss in 414 of FIG. 4A, congestion actions are performed, according to 418 of FIG. 4B.

The number P is one example of the pre-determined first number of data packets, whereas the number p is one example of the pre-determined second number of consecutive data packet loss events. The number N is one example of the pre-determined third number of data packet loss events.

It is noted that the performance of the methods as illustrated by the flowcharts of FIGS. 3 and, 4A and 4B, are related but differ to some extent. The flowchart of 4A and 4B may be considered to be a refinement of the one of FIG. 3, and comprises 404A or 404B, with which the risk of considering a congestive loss to be a non-congestive loss, is decreased.

Figure 7:
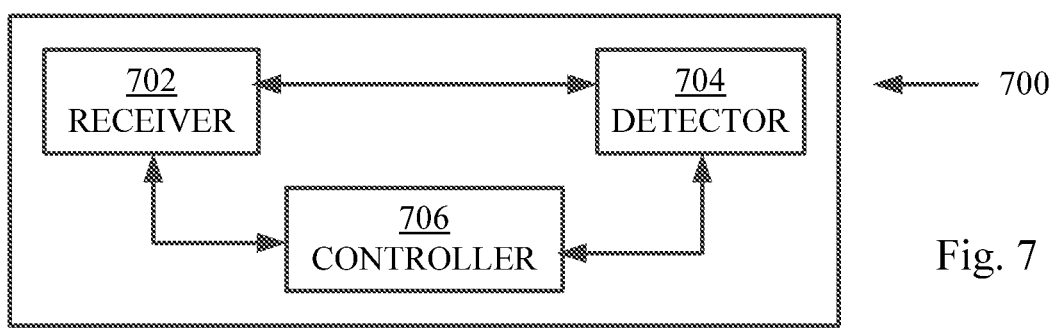
FIG. 7, schematically illustrates a network node according to embodiments of the invention.

FIG. 7 presents block diagram of a network node 700 that is configured for increased utilization of a transport network link in receiving a data packet flow from another network node over the transport network of a HSPA system. The network node comprises a receiver 702 that is configured to receive the data packet flow, and a detector 704 that is configured to detect 102; 202; 302 a data packet loss in the received data packet flow, and to detect 104; 204; 306 data delay information of data packets of the data packet flow. The network node also comprises a controller 706 that is configured to determine 106; 206, 208, 210; 308, 310, 312 if the detected data packet loss comprise non-congestive data packet loss, based on the detected data packet loss and the detected data delay information. The controller is also configured to, for a pre-determined time period omit to perform 108, 212, 316 a congestion action towards the first network node affecting the data packet flow, when the detected data packet loss comprises non-congestive data packet loss.

The detector 704 may be configured to detect a gap in a sequence of data packets of the data packet flow.

The detector 704 may also be configured to detect a delay of a data packet of the data packet flow based on a reference time filled in a time field of the data packet.

The detector 704 and the controller 706 may be implemented as a congestion detector of the network node 700.

The flow of data packets may comprise a flow of data frames.

The network 700 node may comprise a Node B or a radio network controller, RNC. Embodiments of the invention may thus be implemented in both the RNC and the Node B, for applying embodiments of the invention in both the uplink and downlink, respectively, of the transport network link.

Whereas embodiments of the invention can be used together with random early drop, it is proposed to switch the random early drop off when applying an embodiment of the present invention. This is to minimize any unforeseen drawbacks due to protocol interactions.

It is advantageous with example embodiments that the end user throughput and the utilization of low quality TN links is increased by omitting to perform unnecessary congestion actions in the case of non-congestive packet loss events.

It may be further noted that the above described embodiments are only given as examples and should not be limiting to the present invention, since other solutions, uses, objectives, and functions are apparent within the scope of the invention as claimed in the accompanying patent claims.

ABBREVIATIONS

ABCC—AQM based congestion control
AQM—active queue management
HSPA—high-speed packet access
LTE—long-term evolution
RNC—radio network controller
TCP—transmission control protocol
TN—transport network

The invention claimed is:

1. A method for increased utilization of a transport network link in receiving a data packet flow from a first network node over the transport network of a high-speed packet access, HSPA, system, the method being performed in a second network node, the method comprising:
    detecting a data packet loss of a first packet in receiving a data packet flow from the first network node,
    detecting data delay information for one or more received packets in the same data packet flow as the first packet, wherein the one or more received packets are different packets than the first packet,
    determining if the detected data packet loss of the first packet comprises non-congestive data packet loss, based on the detected data packet loss and the detected data delay information, and
    when the detected data packet loss comprises non-congestive data packet loss, for a pre-determined time period omitting to perform a congestion action towards the first network node affecting the data packet flow.

2. The method according to claim 1, wherein determining comprises determining if a time dependence of the data delay of data packets being received is decreasing with time.

3. The method according to claim 1, further comprising determining the number of data packet loss events, during a pre-determined first time period or per a pre-determined first number of data packets sent from the first network node, based on the detected data packet loss.

4. The method according to claim 3, when the determined number of data packet loss events comprises a number of data packet loss events during a pre-determined second time period, considering said number of data packet loss events during the pre-determined second time period as a single data packet loss event.

5. The method according to claim 3, when the determined number of data packet loss events comprises less than a pre-determined second number of consecutive data packet loss events, considering said consecutive data packet loss events as a single data packet loss event.

6. The method according to claim 3, when the determined number of data packet loss events comprises more than a pre-determined third number of data packet loss events, determining that the detected data packet loss comprises congestive data packet loss.

7. The method according to claim 1, wherein omitting to perform a congestion action, comprises omitting to reduce the maximum allowed bitrate for the data packet flow, or to inform the transport layer related to the first and second network nodes, about transport network congestion with a dropped application level Internet protocol data packet.

8. The method according to claim 1, wherein detecting data delay information comprises detecting a delay of a data packet of the data packet flow received by the second network node, based on a reference time filled in a time field of the data packet.

9. The method according to claim 1, wherein receiving the data packet flow comprises receiving a high-speed uplink packet access, HSUPA, data packet flow, or a high-speed downlink packet access, HSDPA, data packet flow.

10. The method according to claim 1, wherein determining comprises determining if the data delay of received data packets is within a pre-defined delay threshold.

11. The method according to claim 1, wherein detecting a packet loss comprises detecting a gap in a sequence of data packets of the data packet flow.

12. The method according to claim 1, wherein detecting a packet loss comprises detecting a corrupt data packet among the data packets of the data packet flow.

13. A network node configured for increased utilization of a transport network link in receiving a data packet flow over the transport network of a high-speed packet access, HSPA, system, said network node comprising:
    a receiver configured to receive the data packet flow,
    a detector configured to detect a data packet loss of a first packet in receiving the data packet flow, and to detect data delay information for one or more received packets in the same data packet flow as the first packet, wherein the one or more received packets are different packets than the first packet, and
    a controller configured to
        determine if the detected data packet loss of the first packet comprises non-congestive data packet loss, based on the detected data packet loss and the detected data delay information, and
        for a pre-determined time period omit to perform a congestion action towards another network node affecting the data packet flow, when the detected data packet loss comprises non-congestive data packet loss.

14. The network node according to claim 13, wherein the detector is configured to detect a gap in a sequence of data packets of the data packet flow.

15. The network node according to claim 13, wherein the detector and the controller are implemented as a congestion detector of the network node.

16. The network node according to claim 13, wherein the flow of data packets comprises a flow of data frames.

17. The network node according to claim 13, wherein the network node comprises a Node B or a radio network controller.

18. The network node according to claim 13, wherein the detector is configured to detect a delay of a data packet of the data packet flow based on a reference time filled in a time field of the data packet.

19. The network node according to claim 18, wherein the detected data delay information indicates the data packet loss is non-congestive data packet loss based on whether the data delay of received data packets is within a pre-defined delay threshold.

20. The network node according to claim 13, wherein the detected data delay information indicates the data packet loss is non-congestive data packet loss based on whether a time dependence of the data delay of data packets being received is decreasing with time.

* * * * *